United States Patent
Riedel et al.

(10) Patent No.: US 11,698,280 B2
(45) Date of Patent: Jul. 11, 2023

(54) INSPECTING AN ULTRASOUND FLOW METER

(71) Applicant: SICK Engineering GmbH, Ottendorf-Okrilla (DE)

(72) Inventors: Ekkehard Riedel, Ottendorf-Okrilla (DE); Martin Oberländer, Ottendorf-Okrilla (DE); Arnd Schlicke, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 103 days.

(21) Appl. No.: 17/358,439

(22) Filed: Jun. 25, 2021

(65) Prior Publication Data

US 2021/0404848 A1 Dec. 30, 2021

(30) Foreign Application Priority Data

Jun. 26, 2020 (EP) .................................... 20182643

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
CPC .............. G01F 1/662; G01F 1/667; G01F 1/66
See application file for complete search history.

(56) References Cited

U.S. PATENT DOCUMENTS

| 5,277,070 A | 1/1994 | Dorr | |
|---|---|---|---|
| 2009/0178490 A1* | 7/2009 | Konzelmann | G01F 1/668 73/861.29 |

FOREIGN PATENT DOCUMENTS

| DE | 4421692 A1 | 1/1996 |
| DE | 19605652 A1 | 8/1997 |
| DE | 19843806 A1 | 3/2000 |
| DE | 102008026620 A1 | 12/2009 |
| EP | 3521773 A1 | 8/2019 |
| WO | 9600375 A1 | 1/1996 |
| WO | 2013006090 A1 | 1/2013 |

OTHER PUBLICATIONS

Machine translation of WO1996/000375A1 (Year: 1996).*
Eurpoean Search Report dated Dec. 11, 2020 for application No. EP 20182643.5.

* cited by examiner

Primary Examiner — Alesa Allgood
Assistant Examiner — Sangkyung Lee
(74) Attorney, Agent, or Firm — Nath, Goldberg & Meyer; Jerald L. Meyer (57) ABSTRACT

An inspection device for an ultrasound flow meter is provided that has an inspection chamber having a fluid at a flow velocity of zero and having a first installation station for a first ultrasonic transducer and having a second installation station for a second ultrasonic transducer of the ultrasound flow meter so that the ultrasonic transducers are aligned toward one another in the installed state and span an ultrasound measurement path through the inspection chamber on the connection line. The invention further relates to a method of inspecting and/or calibrating an ultrasound flow meter.

20 Claims, 3 Drawing Sheets

INSPECTING AN ULTRASOUND FLOW METER

The invention relates to an inspection device for an ultrasound flow meter and to a method of inspecting and/or calibrating an ultrasound flow meter.

A proven method for measuring the flow velocity or the flow rate is the differential time of flight method. In this process, a pair of ultrasonic transducers is mounted with mutual offset in the longitudinal direction at the outer periphery of the conduit, said pair of ultrasonic transducers transmitting and receiving ultrasonic signals alternately transversely to the flow along the measurement path spanned between the ultrasonic transducers. The ultrasonic signals transported through the fluid are accelerated or decelerated by the flow depending on the running direction. The resulting time of flight difference is calculated using geometrical parameters to form a mean flow velocity of the fluid. The volume flow or flow rate results from this with the cross-sectional area. For more exact measurements, a plurality of measurement paths each having a pair of ultrasonic transducers can also be provided to detect a flow cross-section.

Ultrasound flow rate measurement devices measure flow velocities without mechanical components. The measurement also becomes possible at very small flow velocities and even at rest thanks to this property. The reciprocal transmission and reception of the signals, the transit time difference formation and the calculation of the flow velocity take place in the resting fluid with the same physical transmission paths and principles of action as at higher flow velocities.

Conversely, this behavior means that ultrasound flow meters can be inspected with respect to their correct function by a measurement in the resting fluid. A special chamber is used for this purpose in which a known fluid, in the simplest case air, is at rest or at the flow velocity of zero. Such a device can be called a zero point box.

Zero point measurements are accordingly carried out to inspect an ultrasound flow meter, i.e. the ultrasound flow measurement device determines the flow velocity and the speed of sound in the zero point box. Units can thus be inspected, but also the probe-specific system times of flight can be detected and the ultrasound flow measurement device can thus be (re)calibrated.

Zero point boxes of previous construction, however, require long settling times before a flow of zero has actually been adopted and they are sensitive to external influences such as temperature changes, pressure fluctuations, impact, and blows. In addition, the measurements are not fully reliable in part due to measurement artifacts caused by the zero point box itself.

WO 2013/006090 A1 describes a calibration method for ultrasound flow measurement devices. The reference speed of sound with the non-flowing medium is determined in a first step for this purpose. However, the calibration takes place in the field with a unit mounted in the line; the flow is first stopped by a check valve. A zero point box is accordingly not provided.

In U.S. Pat. No. 6,277,070 A, respective reference targets are associated with the ultrasonic transducers for a calibration with stationary gas (zero flow). A zero point box Is not used for this purpose here either.

An ultrasound flow measurement apparatus is known from EP 3 521 773 A1 in which the ultrasonic transducers are positioned such that a respective part pulse is isolated in time in the received signal. This relates to the actual flow rate measurement; EP 3 521 773 A1 does not deal with a calibration.

It is therefore the object of the invention to improve the inspection or calibration of an ultrasound flow meter.

This object is satisfied by an inspection device for an ultrasound flow meter and by a method of inspecting and/or calibrating an ultrasound flow meter in accordance with the respective independent claim. In this respect, inspection means determining whether the ultrasound flow meter outputs a measurement result that is expected under the controlled conditions of the inspection device, whereas calibration means the (repeat) setting of parameters to achieve this goal, for instance to measure and to compensate system-specific times of flight. Both can already take place during manufacture or in the field during maintenance.

A fluid is present in an inspection chamber that can be the fluid to be measured later or preferably simply air. The fluid is stationary, the flow velocity is accordingly zero (zero flow). The zero point or a measurement result of the ultrasound flow meter at a flow velocity of zero is checked. The inspection device can accordingly be called as zero point box as presented in the introduction. The inspection chamber has two installation stations at which a respective ultrasonic transducer of an ultrasonic transducer to be inspected is mounted, preferably in a sealed manner. The installation stations are preferably each located in a wall of the inspection chamber to completely utilize its dimensions. The arrangement of the installation stations is defined by the arrangement of the ultrasonic transducers that accordingly span a defined ultrasound measurement path on the connection line to one another through the inspection chamber.

The invention starts from the basic idea of configuring the geometry of the inspection chamber such that a particularly exact zero point measurement becomes possible. In this process, it is the inner space of the inspection chamber that is important; the inspection device itself can have a different geometry due to the wall thicknesses, connectors, and the like. Specific demands are made and satisfied on the path length or on the length L of the ultrasound measurement path and on the distance a of the ultrasound measurement path from the side walls of the inspection chamber. The wanted signal is thereby separated in time from interference echoes and secondary ultrasound signals. The length L and the distance a of the ultrasound measurement path are determined by the arrangement of the installation stations. Depending on the installation of the ultrasonic transducers, certain differences can in particular result for the length L that are accepted as tolerances or are taken into account by a length measurement and a length parameterization. The two geometrical conditions of a sufficient length L and of a sufficient distance a can be satisfied individually or in combination.

The wanted signal is the direct ultrasound signal that propagates from the first ultrasonic transducer to the second ultrasonic transducer on their connection line. The stated order from the first ultrasonic transducer to the second ultrasonic transducer takes place without any restriction of the general applicability, particularly since a measurement is anyway also carried out in the opposite direction in a differential time of flight process. The direct ultrasound signal is, however, not the only signal that the receiving ultrasonic transducer registers. Some of the ultrasound is reflected, returns to the transmitting ultrasonic transducer, and is again reflected in part there. The receiving ultrasonic transducer therefore also registers an echo. It is ensured in accordance with the invention by a sufficient length of the ultrasound measurement path that the echo is no longer superposed on the wanted signal. Later echoes after the first echo are weak and satisfy the condition of the separation in time all the more.

Further interference signals are created in that the ultrasound signal does not only take the route of the ultrasound measurement path. Such portions reaching the receiving ultrasonic transducer by simple or multiple reflection at the side walls of the inspection chamber or by an at least partial propagation through the walls themselves (structure-borne sound) are called secondary ultrasound signals. It is achieved by a sufficient distance a of the ultrasound measurement path from the sidewalls that the secondary ultrasound signals are no longer superposed on the wanted signal.

Side walls mean those walls of the inspection chamber that adjoin a wall of an installation station. Despite the wording in the plural, there can also only be a single side wall. The distance a should preferably be observed from all the side walls. As an example, with a parallelepiped-shaped inspection chamber, the installation stations are arranged in the base or in the top, the side walls are then the remaining four faces of the parallelepiped. With a cylinder, likewise with installation stations in the base or in the top, there is only one side wall, namely the jacket surface.

The invention has the advantage that the geometry of the inspection chamber or the arrangement of the installation stations therein, that is only possible at all with a suitable geometry, provides a separated and easily usable wanted signal. Influences by echoes and secondary ultrasound signals on further sound paths in the interior of the inspection chamber such as structure-borne sound through the wall no longer have an effect on the measurement result. Only minimal convection flows occur in the inspection chamber due to a small volume of the inspection chamber. The flow-calmed state is achieved in a short time. Due to the optimized design and due to further optimizations still to be explained, the influence of temperature and pressure on the housing interior is furthermore minimized, the inspection device is insensitive to changes of the environmental temperatures, of the environmental pressure, and to pressure waves and mechanical influences. The speed of sound, the resolution and the general measurement value noise of the ultrasound flowmeter can also be inspected in addition to the measurement values for the flow velocity.

The inspection chamber preferably has a minimal volume, i.e. the dimensions are only just so large that the conditions on the length of the ultrasound measurement path and on the distance of the ultrasound measurement path from the side walls are satisfied. The above-named minimum dimensions also have to be observed to separate the wanted signal. In accordance with this preferred embodiment, the minimum dimensions are now simultaneously understood as maximum dimensions and are accordingly observed as exactly as possible. This only has to apply within practical limits or with a certain tolerance, with the inspection chamber rather being designed as a little too large in cases of doubt. In this manner, the volume can be minimized and a particularly small inspection chamber can be implemented without impairing the improvements of the inspection. There are practically no convection flows due to the small volume and the inspection device becomes particularly compact and manageable overall.

The installation stations and consequently the ultrasound measurement path are preferably arranged centrally in the inspection chamber. The distance a from the side walls is thereby maximized in all directions. The inspection chamber can consequently be designed as particularly small. In the already used examples of an inspection chamber with the geometry of a parallelepiped or of a cylinder, the ultrasound measurement path then preferably lies on a center axis through the base and top.

The length L of the ultrasound measurement path predefined by the distance between the installation stations preferably satisfies the condition $$L \geq s * \tau * n_\tau * \frac{c_0}{2},$$

with a speed of sound $c_0$, a safety factor s, in particular s=1.5, and ultrasound signals with $n_\tau$ periods of a period length $\tau$. If this condition has been satisfied, echoes only arrive at the receiving ultrasonic transducer after the wanted signal has been received, preferably fully and at least largely. The inspection device is thus particularly well-suited for specific ultrasound signals that use ultrasound pulses having $n_\tau$ periods of the period length $\tau$ corresponding to the ultrasound frequency. The transmitted number of periods can in another respect also be higher than $n_\tau$; the value $n_\tau$ then indicates the somewhat weaker condition of how many of the possibly larger number of actually present periods are required for a robust measurement. The safety factor s provides an additional time spacing and thereby a certain tolerance both for differing ultrasound signals and for other influences. s=1.5 has provided to be a suitable value. Larger or smaller values are, however, also conceivable depending on how reliably a superposition should be precluded or a residual superposition should be tolerated.

The distance a of the ultrasound measurement path from the side walls predefined by the distance of the installation stations from the respective adjacent side walls preferably satisfies the condition $$a \geq \sqrt{\frac{(c_0 * \tau * n_\tau * s + L)^2}{4}},$$

with a speed of sound $c_0$, a safety factor s, in particular s=1.5, and ultrasound signals with $n_\tau$ periods of a period length $\tau$. If this condition has been satisfied, secondary ultrasound signals only arrive at the receiving ultrasonic transducer after the wanted signal has been received, preferably fully and at least largely. The statements of the previous paragraph apply to the variables of this formula. L, as everywhere, designates the length of the ultrasound measurement path.

The inspection chamber preferably has a sound-absorbing material at its walls. The sound absorption can be achieved by the material itself and/or by its structuring. The interior space of the inspection chamber is thus protected from external influences. In addition, reflections and secondary ultrasound signals resulting therefrom are damped.

The inspection chamber preferably has non-planar side surfaces and is in particular cylindrical. The influence of pressure fluctuations in the inspection chamber is reduced by such side surfaces. With a cylinder, this is not only achieved at all sides, but a minimal volume rather simultaneously becomes possible in which a central ultrasound measurement path equally observes the distance a from all sides.

The inspection chamber is preferably produced from a non-metallic material, in particular from plastic. A material having a relatively small density reduces the structure-borne sound and also the total weight of the inspection device.

At least one dividing element is preferably arranged in the inspection chamber. The interior of the inspection chamber is thereby in particular divided into a plurality of partial volumes. Convection flows are thus additionally suppressed because they can in each case only form in the partial volumes. The desired flow velocity of zero is therefore reached in shorter settling times and this state is maintained more robustly or is readopted very rapidly after disturbances. The dividing elements are preferably permeable to sound for the ultrasound signals to be checked. The measurement is thus not impaired. Alternatively, the effects of the dividing elements can also be measured and compensated.

The inspection device preferably has a pressure sensor, a temperature sensor, and/or a humidity sensor. Initially, only bores or other apertures can also be provided to introduced such sensors. Key values of the fluid in the inspection chamber such as the pressure, temperature, and/or air humidity are thereby measured that have effects on the propagation behavior of the ultrasound in the fluid in the interior of the inspection chamber.

A control and evaluation unit of the inspection device is preferably configured to calculate a speed of sound for the fluid in the inspection chamber. This is preferably done on the basis of the measurements of the just-named sensors. After this calculation, an expected value for the speed of sound is known that can be displayed or that can be used internally for the inspection and/or calibration.

The inspection device preferably has an interface to receive measurement values of the ultrasound flow meter, in particular a measured flow velocity or speed of sound and/or to transfer parameters, in particular the length L of the ultrasound measurement path, to the ultrasound flow meter. The inspection device is thus able to communicate with the ultrasound measurement device. This can also be done indirectly via a connected PC, a tablet, a smartphone, or the like. On the one hand, measurement values for the inspection or calibration can be read or, on the other hand, an ultrasound flow meter to be inspected can be set so that the inspection or calibration is made possible. One parameter for this is the length L of the ultrasound measurement path. It would also be conceivable, for example, to parameterize for the fluid used in the inspection chamber such as air or to communicate measurement values of the sensors.

A control and evaluation unit of the inspection device is preferably configured to compare a flow velocity measured in the inspection chamber with zero and/or a speed of sound measured in the inspection chamber with an expected speed of sound. This control and evaluation unit can be a connected unit such as a PC, a tablet, a smartphone, or the like. A check is then made therein whether the ultrasound flow meter actually measures a flow velocity of zero within the required measurement accuracy or whether the speed of sound required for this purpose was correctly determined. In the event of deviations, the control and evaluation unit can make parameter suggestions for a (re)calibration, particularly preferably in a feedback loop that automatically ensures that the ultrasound flow meter passes the inspection at the end.

The installation stations are preferably arranged at oppositely disposed walls of the inspection chamber. A straight-line, unbroken ultrasound measurement path is thereby produced. The ultrasonic transducers are, for example, attached opposite one another and facing one another in the base and top of an inspection chamber designed with the geometry of a parallelepiped or of a cylinder.

The installation stations are alternatively arranged at the same wall of the inspection chamber and an ultrasound reflector is arranged at the oppositely disposed wall of the inspection chamber. This produces a kinked ultrasound measurement path via the ultrasound reflector. The ultrasonic transducers are still directed toward one another, but now mediated by the ultrasound reflector. The ultrasonic transducer can be integrated in the oppositely disposed wall or can be a section thereof, for example in that locally no sound-absorbing material or sound-absorbing structure is provided.

The inspection device is preferably formed in two parts with a first part and a second part of the inspection chamber so that it can be opened and closed. This makes a particularly simple access possible to attach the ultrasonic transducers in the installation stations or to replace ultrasonic transducers. In this respect, a design with a top is equally as possible as a true two-part design in which the inspection chamber can be disassembled into two parts.

The inspection device preferably has dimensions and a weight by which it can be transported by one person under their own power. A service engineer can thus easily carry the inspection device with him and deploy it in the field as required. A conventional inspection and calibration bench for ultrasound flow meters, in contrast, is fixedly mounted as a rule and so large and heavy that one person could not move it at all.

In the method in accordance with the invention for inspection and/or calibration, the ultrasonic transducers of the ultrasound flow meter to be inspected are mounted at the provided installation stations in a test chamber in which a fluid is present at a flow velocity of zero. The flow velocity and/or the speed of sound in the inspection chamber is then measured by the ultrasound flow meter. The wanted signal is received separated in time in this process due to the geometry of the inspection chamber and the explained demands on the length L and/or on the distance a of the ultrasound measurement path. The method is particularly preferably carried out using an embodiment of the inspection device in accordance with the invention.

The check whether the measurement values are within the permitted measurement inaccuracy takes place by the service engineer or automatically in a control and evaluation unit of the inspection device, for example in that the service engineer connects a computer or a corresponding portable unit. The service engineer preferably configures the ultrasound flow meter in advance for the conditions in the inspection chamber, in particular the length L of the ultrasound measurement path. In addition, a pause is preferably made for a compensation time period after the installation of the ultrasonic transducers until the fluid in the inspection chamber has come to rest.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
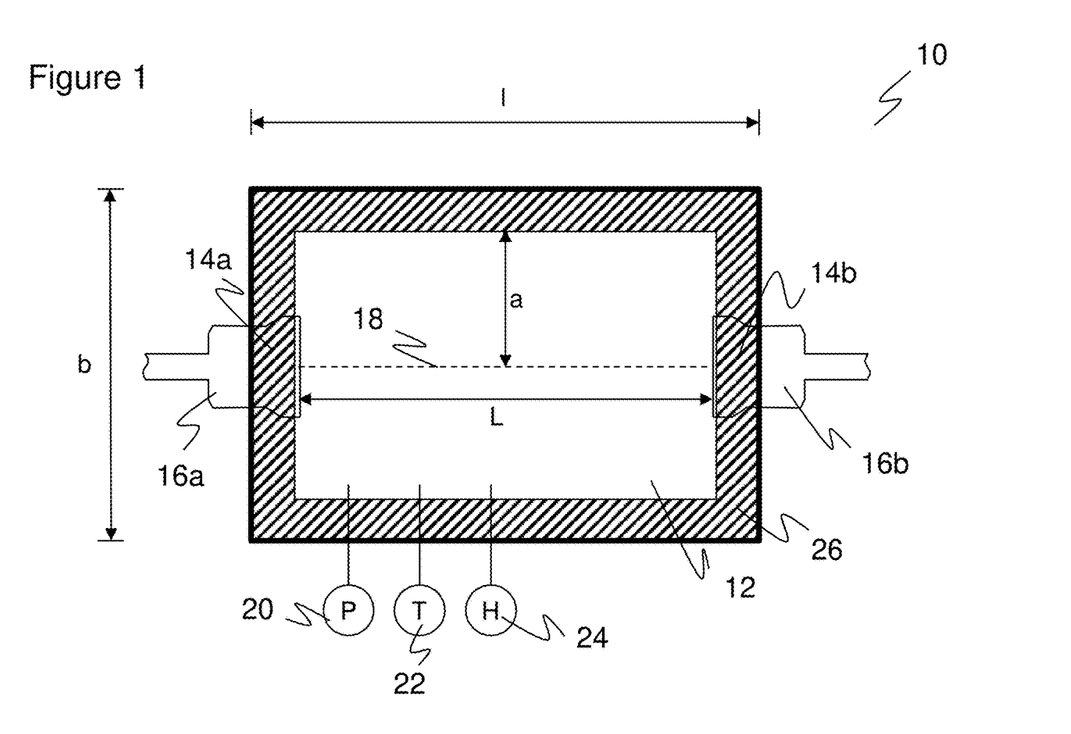
FIG. 1 a schematic representation of an inspection device and of the geometrical relationships of its inspection chamber.

FIG. 1 shows a schematic representation of an inspection device 10 for an ultrasound flow meter. The inspection device 10 can be used in production or in the field to inspect or to calibrate ultrasound flow meters. The inspection device 10 has an inspection chamber 12 in which a stationary fluid is present. The fluid can simply be air corresponding to the environment of the inspection device 10, but it would also be conceivable to fill in a different fluid. To be able to intervene in the interior space of the inspection chamber 12, it is preferably designed in two parts, either with a top or with two separable halves.

The inspection chamber 12 has a length I and a width b. In the depth direction, not recognizable, the extent preferably likewise corresponds to the width b. The flow velocity accordingly amounts to zero (zero flow) and it is expected that the ultrasound flow meter also measures this in the inspection. It is accordingly a zero point measurement or a zero point balance.

A respective installation station 14a-b for an ultrasonic transducer 16a-b is provided at two oppositely disposed walls of the inspection chamber 12. Ultrasonic transducers 16a-b mounted therein face one another and span an ultrasound measurement path 18 of the length L on the connection line. The distance from the side walls of the inspection chamber 12 is a. The offset of the ultrasonic transducers 16a-b required in the flow direction in accordance with the differential time of flight process is dispensed with since there is no flow.

The inspection device 10 has a pressure sensor 20, a temperature sensor 22, and a humidity sensor 24. They can be integrated in the inspection chamber 12 or the latter has corresponding apertures to also subsequently introduce the sensors 20, 22, 24. Said sensors 20, 22, 24 determine key parameters that have an effect on the propagation rate of ultrasound. A different choice of sensors is nevertheless also conceivable.

The inspection chamber 12 should be well insulated against external influences such as blows, temperature fluctuations and pressure fluctuations for an optimum measurement. Otherwise compensation flows would be stimulated in the interior of the inspection chamber 12 that either falsify the measurement result or extend the inspection time to respectively enable a settling of the fluid.

An advantageous measure that reduces pressure fluctuations in the inspection chamber 12 is the avoidance of straight surfaces at the outer sides. A cylindrical form of the inspection chamber 12 is particularly suitable for this, with this cylinder being shown in FIG. 1 in a longitudinal section with a base and top surface at the right and left. Alternatively, however, a parallelepiped shape is also conceivable, preferably with curved side surfaces or another shape.

The inspection chamber 12 should remain as small as possible to minimize convection flows whose strength increases with a growing volume of the inner space. The inspection device 10 thereby also becomes more compact as a whole. As explained below, however, a minimal volume is required for an exact measurement, on the other hand. The invention enables an optimum compromise here.

A non-metal is advantageous as the material for the walls of the inspection chamber 12. Due to the smaller density, possible sound feedback, that is a coupling of the ultrasound into the wall and a coupling at the receiving ultrasonic transducer 16a-b is very largely precluded. The walls and in particular the inner wall of the inspection chamber 12 advantageously comprise a sound-absorbing material 26. This considerably reduces the amplitude of ultrasound reflected there. At the same time, an additional thermal insulation of the fluid in the inspection chamber 12 and a certain protection from pressure fluctuations and mechanical influences result. The sound-absorbing material 26 is a sound-absorbing foam, for example.

The mechanical suspension of the ultrasonic transducers 16a-b is preferably designed such that feedback of the ultrasound signal via the walls of the measurement chamber 12 ("structure-borne sound") is suppressed. It would otherwise be superposed on the measurement signal and result in additional measurement errors. In addition, the ultrasonic transducers 16a-b are preferably mounted in the installation stations 14a-b in a sealed manner.

Figure 2:
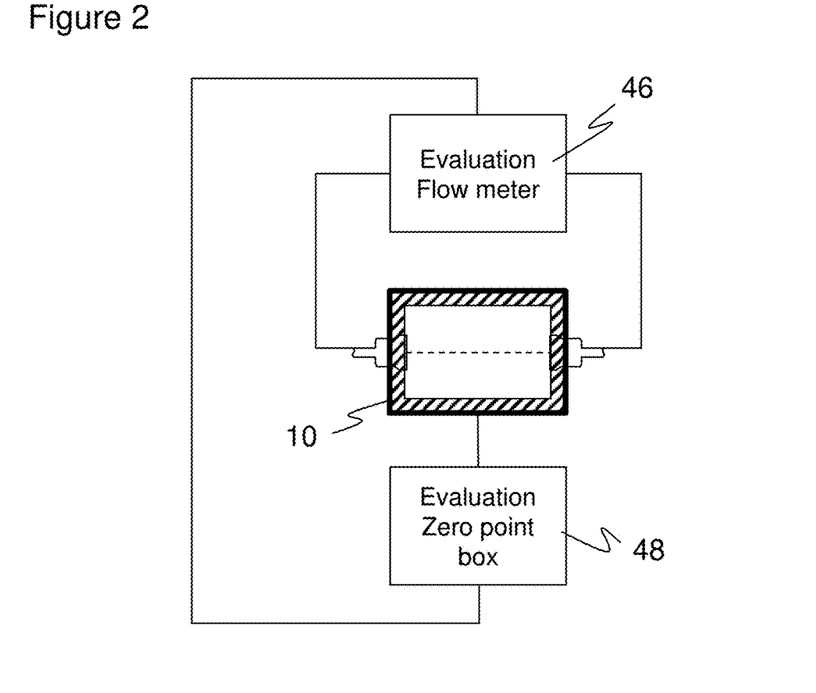
FIG. 2 a schematic representation for the evaluation of the inspection results.

FIG. 2 shows schematically and by way of example how the inspection device 10 can be connected to evaluation electronics for the inspection. The ultrasound flow meter to be inspected having the two ultrasonic transducers 16a-b first has its own control and evaluation unit 46. It is its measurement electronics by which there are determined times of flight and from this the flow velocity using a differential time of flight method and further measurement values to be checked. In addition, the inspection device 10 is connected to a further control and evaluation unit 48 for carrying out the inspection. This further control and evaluation unit 48 can be integrated in the inspection device 10 or can be a computer connected thereto, for instance a PC, a tablet, or a smartphone. A remote connection via a network is also conceivable.

The method for inspecting and calibrating an ultrasound flow meter runs as follows. The inspection chamber 12 is opened and the ultrasonic transducers 16a-b are then installed at the provided installation stations 14a-b. The length L is determined and is configured in the ultrasound flow meter. The inspection chamber 12 is subsequently closed again. After a compensation time period that can remain short due to the embodiment in accordance with the invention still to be explained, for example only five minutes, the pressure, temperature, and air humidity are measured by means of the sensors 20, 22, 24. A speed of sound that is theoretically to be expected is determined from this, for example in accordance with the method of Own Cramer.

The flow velocity and preferably also the speed of sound are then measured by means of the ultrasonic transducers 16a-b. It is recorded and evaluated by the further control and evaluation unit 48, for example. The inspection chamber 12 is designed such that flow fluctuation and temperature influences are minimized as much as possible. For this reason, the unit has to determine a flow velocity of 0 m/s and the theoretically calculated speed of sound on a perfect functioning, with tolerances or permitted measurement inaccuracies being able to be specified for both. It is conceivable in a preferred embodiment to act on the parameterization of the ultrasound flow meter on a difference and so to (re) calibrate it.

In addition to or in place of the described measurement values of flow velocity and speed of sound, further measurement values can also be checked such as receive gain, signal-to-noise ratio, and signal quality.

Figure 3:
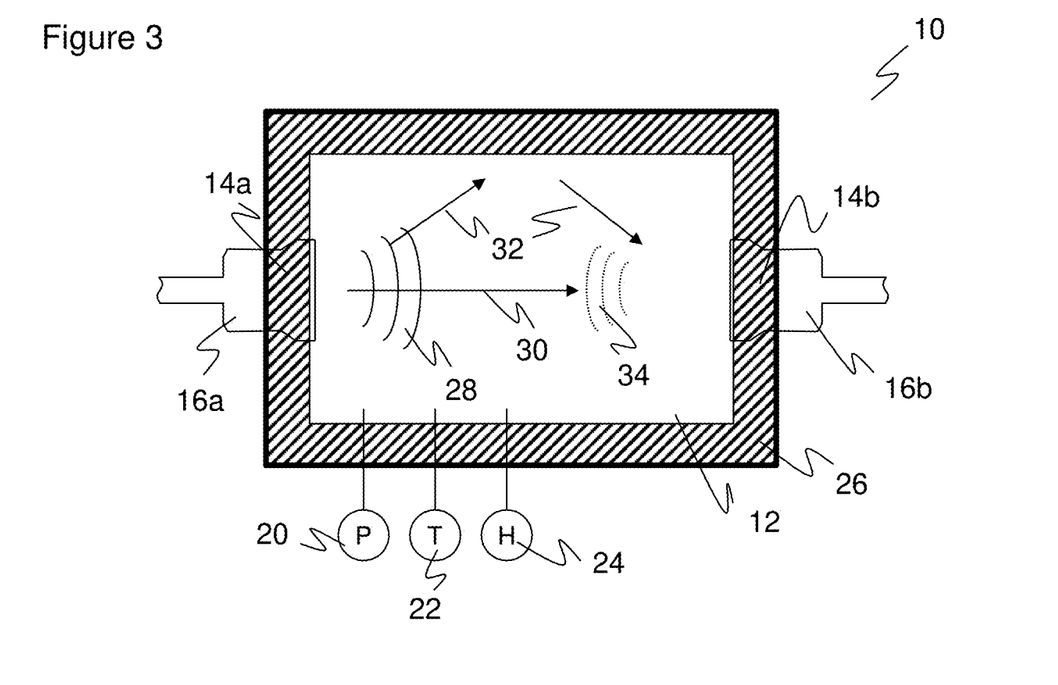
FIG. 3 a further schematic representation of an inspection device for the explanation of echoes and secondary sound paths.

FIG. 3 shows a further schematic representation of the inspection device 10 to illustrate the different sound paths of the ultrasound signal 28. A primary sound path 30 runs on the provided ultrasound measurement path 18 between the ultrasonic transducers 16a-b. The ultrasound signal 28 directly reaches the oppositely disposed ultrasonic transducer 16b-a on the primary sound path 30. This is the wanted signal with which the measurement of the time of flight and based thereon the calculation of the flow velocity take place.

In addition to the wanted signal from the provided direct propagation path of the primary sound path 30, there are, however, still further signal portions by parts of the ultrasound signal 28 that do not directly propagate from the one ultrasonic transducer 16a-b to the other ultrasonic transducer 16b-a. This is, on the one hand, due to secondary sound paths 32, that is propagation paths that can arise due to reflections of the ultrasound signal 28 at the walls of the inspection chamber. The reason for this is the conical irradiation characteristic of the ultrasonic transducers 16a-b that also transmits sound portions laterally in the direction of the wall. These portions are then reflected once or multiple times at the wall and can thus likewise be registered as secondary ultrasound signals in the receiving ultrasonic transducer 16b-a. Echoes furthermore are also produced. They are signal portions that are first reflected at the receiving ultrasonic transducer 16b-a or at the surrounding wall and then again on sides of the transmitting ultrasonic transducer 16a-b.

The wanted signal, secondary ultrasound signals, and the echo are superposed on one another in the received signal. Such a time-dependent received signal is illustrated by way of example in FIG. 4. The wanted signal 36 has the shortest path and is therefore received first. Secondary ultrasound signals and echoes then arise later that are shown here as representative by an interference signal 38. There can also be parasitic signal portions 40 at the time shown or at other times. This is caused, for example, by signal crosstalk or by structure-borne sound. These parasitic signal portions 40 are as a rule found even earlier than the wanted signal 36.

Figure 4:
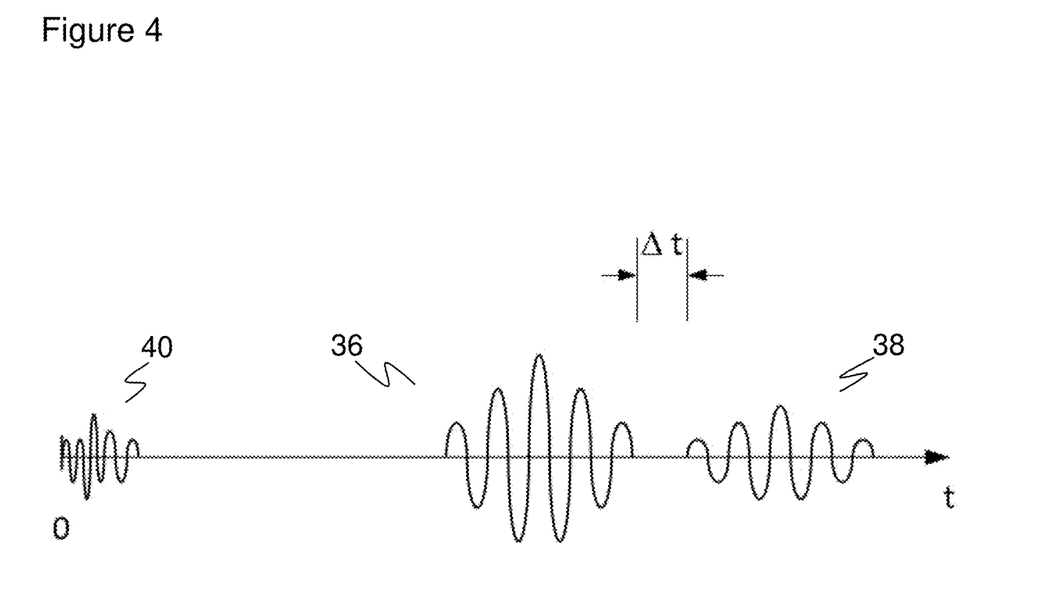
FIG. 4 an exemplary representation of a received ultrasound signal with wanted signal and interference.

Under unfavorable conditions, interference signals 38 arrive so early that they are still superposed on the wanted signal 36. There is then interference of the time of flight measurement and there are thus errors in the determination of the flow velocity and the speed of sound. A clear temporal separation is therefore desired such as is indicated in FIG. 4 by the distance Δt.

In accordance with the invention, a sufficient temporal separation is provided by the geometrical conditions of the inspection chamber 12. In addition to the geometry, the irradiation characteristics of the ultrasonic transducers 16a-b, the ultrasound frequency, the speed of sound, and the number of signal periods also play a role. The geometry can be optimized for specific fluids, types of ultrasonic transducers, and/or ultrasound signals. However, an optimized geometry is suitable for a large class of ultrasound flow meters thanks to a selection that is as generally valid as possible, for instance air as the fluid, very large irradiation characteristics, specific ultrasound bands, and highest numbers of signal periods, and due to safety or tolerance buffers.

The two parameters of length L of the ultrasound measurement path 18 and its distance a from the side walls of the inspection chamber have a particularly large influence on an optimum geometry. These two values L, a were introduced in FIG. 1. Advantageous minimal values for these should now be discussed that result in minimal dimensions for the size of the inner space of the inspection chamber 12.

The length L and thus the distance between the ultrasonic transducers 16a-b should be at least so large that parasitic signal portions 40 are abated by parasitic effects such as transmission signal crosstalk or structure-borne sound before the wanted signal 36 Is received. At the same time, it has to be ensured that echoes 34 are received a sufficiently long time later than the wanted signal 36. The criterion for the echoes 34 is as a rule automatically also satisfied by that for parasitic signal portions 40.

Different definitions are conceivable for when there is no longer any superposition. A number $n_\tau$ of signal periods of the period time τ of the ultrasound frequency that is required as a minimum for a time measurement and that has to be received from the wanted signal 36 without interference before the first echo 34 arrives is set as an advantageous embodiment here. The temporal separation is then above all given for later echoes.

The time of flight of the wanted signal is $$t_{primary} = \frac{L}{C_0},$$

where $c_0$ is me speed of sound in the fluid in the inspection chamber 12. The first echo 34 has to cover this distance twice to and once fro, that is $$t_{echo} = \frac{3*L}{C_0} \cdot t_{echo} - t_{primary} > s*\tau*n_\tau$$

should apply to the temporal distance. s is here a safety or tolerance factor that can, for example, be selected as s=1.5.

The condition $$L > s*\tau*n_\tau*\frac{c_0}{2}$$

results from this overall. With a corresponding design of the inspection chamber 12, the wanted signal 36 and the echo 34 are consequently separated from one another sufficiently in time.

For the secondary sound path 32, in contrast, the temporal separation of the secondary ultrasound signals is ensured by a sufficient distance a. In this respect, only the sound path with one reflection is looked at since further reflections only result in additional extensions. The time of flight on the secondary sound path 32 is $$t_{secondary} = \frac{2*\sqrt{\frac{L^2}{4}+a^2}}{C_0}.$$

$t_{secondary} - t_{primary} > s*\tau*n_\tau$ should apply analogously to the condition on L in the case of the echo 34. The condition $$a > \sqrt{\frac{(C_0*\tau*n_\tau*s+L)^2}{4}}$$

thus follows. With a corresponding design of the inspection chamber 12, the wanted signal 36 and the secondary ultrasound signals in the received signal are consequently separated from one another sufficiently in time.

The L indicates the shortest possible longitudinal extent, the a the smallest transverse extent or the smallest radius at which the temporal separation can be achieved. It is particularly advantageous if the conditions on the length L and on the distance a are simultaneously understood as the highest values, that is a respective ">" becomes a "=". The dimensions of the inspection chamber 12 and its volume are then namely minimized while the temporal separation of the wanted signal 36 simultaneously remains ensured. A small volume not only has to be desired due to the construction size of the inspection device 10. The fluid or air movements in the interior and thus convection flows are thereby moreover reduced and the smaller surface reduces the thermal influence of the environment on the fluid in the inspection chamber 12. An optimum of avoidance of acoustic interference signals and simultaneously a minimal volume thus result due to a geometry that satisfies the two formulas $$L = s * \tau * n_\tau * \frac{c_0}{2} \text{ and } a = \sqrt{\frac{(C_0 * \tau * n_\tau * s + L)^2}{4}}.$$

If only one condition is observed, at least one interference influence on the wanted signal 36 is precluded, that is that of echoes 34 or of secondary ultrasound signals. An upward or downward deviation from the equals sign displaces the optimum in the direction of larger volumes with a still greater temporal separation that, however, hardly has any practical effects after what has been said or in the direction toward smaller volumes at the cost of an incomplete interference separation.

Figure 5:
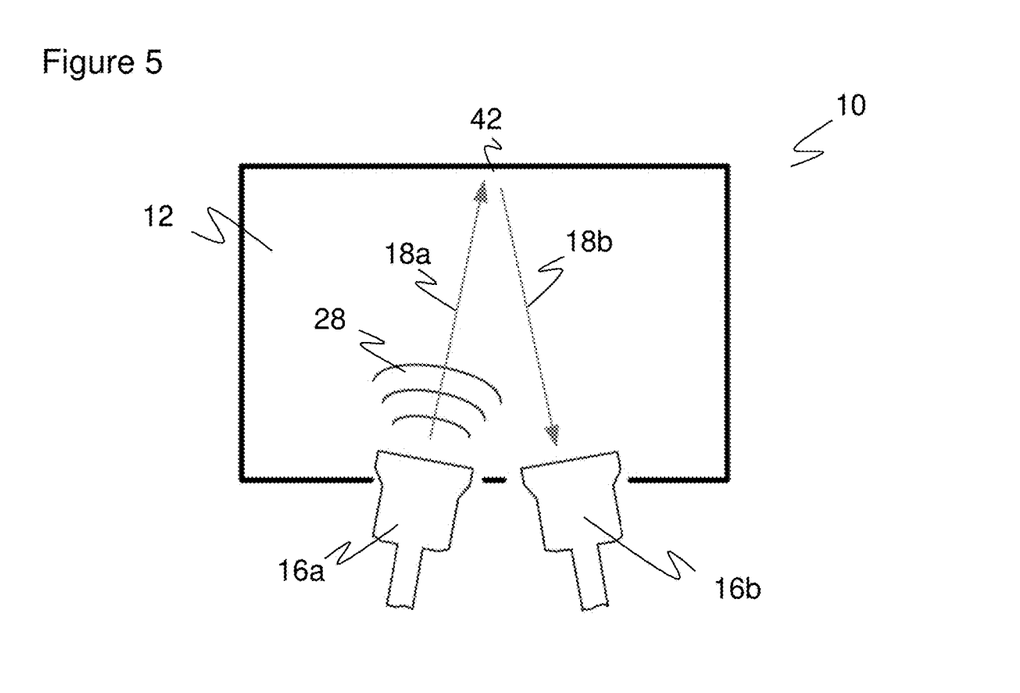
FIG. 5 a schematic representation of an inspection device with an alternative reflective ultrasound measurement path.

FIG. 5 schematically shows a further embodiment of the inspection device 10 with an alternative path arrangement in reflection. Due to the representation, the arrangement is rotated by 90° with respect to FIG. 1, which does not, however, have any technical meaning since the orientation is anyway only to be understood as schematic in all Figures.

The ultrasound measurement path 18 was previously on the direct connection line between oppositely disposed ultrasonic transducers 16a-b. With a path arrangement in reflection, the ultrasound signal 28 is instead transmitted onto the wall and is led to the receiving ultrasonic transducer 16b-a there after reflection. The ultrasound measurement path is thus in two parts with a first portion 18a and a second, reflected portion 18b. The ultrasonic transducers 16a-b are still at least indirectly aligned with one another via the reflection by a connection line running along the ultrasound measurement path 18a-b and the ultrasound measurement path 18a-b divided into two represents the primary sound path here. A reflector 42 is provided in the region of the reflection or the wall itself serves as a reflector here, for example in that sound-absorbing material 26 is dispensed with here.

The reflective embodiment in accordance with FIG. 5 has a longer primary sound path with a smaller construction shape, whereby parasitic crosstalk and similar effects can be masked better. The total length of the inspection device 10 is also reduced with the length I of the inspection chamber. The determination of the path length L is, however, somewhat more complex.

Figure 6:
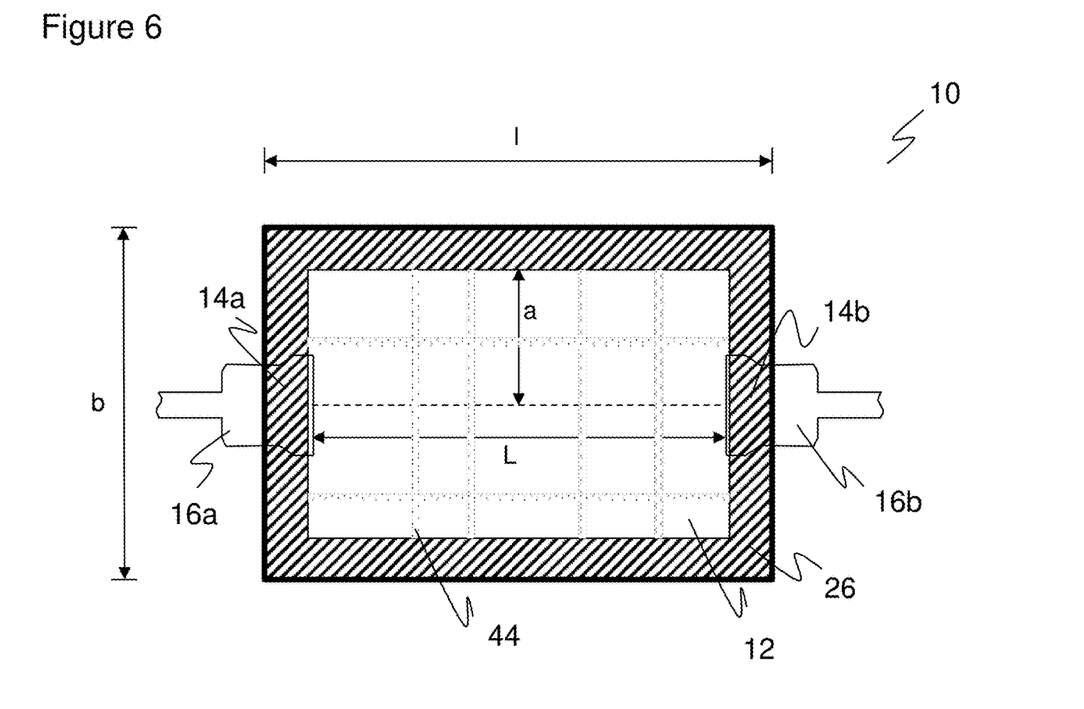
FIG. 6 a schematic representation of an inspection device with dividing elements for dividing the volume in the inspection chamber.

FIG. 6 shows a schematic representation of a further embodiment of the inspection device 10. In this embodiment, additional dividing elements 44 are provided in the interior of the inspection chamber 12 that separate the chamber volume into smaller portions. As already discussed, the suppression of convection in the interior of the inspection chamber 12 is of advantage for the quality of the measurement result, as is the avoidance of convection again induced by external influences. The dividing elements 44 suppress convection by the reduced spatial volume since convections that occur can no longer be imparted over the totality of the volume in the inspection chamber.

The consequences are shorter settling times and a smaller external influence. A further advantage of the introduction of the dividing elements 44 comprises convections that may occur being different and independent in every partial volume. This then results in a certain averaging of the effects in the individual partial volumes during the measurement and the convection influence is thereby at least partially compensated and so further reduced.

The dividing elements 44 are preferably configured as sound-transmitting membranes, for example paper or gauze. The thickness of the membranes is advantageously selected such that the times of flight of the ultrasound signals are thereby not influenced or only as little as possible. It is also conceivable to determine the influence of the dividing elements 44 on the times of flight and to deduct it from the measurement result.

The invention claimed is:

1. A portable inspection device for an ultrasound flow meter, the inspection device comprising:
   an inspection chamber having a fluid at a flow velocity of zero;
   a first installation station for a first ultrasonic transducer; and
   a second installation station for a second ultrasonic transducer of the ultrasound flow meter so that the first and second ultrasonic transducers are aligned toward one another on a connection line in the installed state and span an ultrasound measurement path through the inspection chamber on the connection line,
   wherein the inspection chamber has a geometry in which the distance between the first and second installation stations, and consequently a length, L, of the ultrasound measurement path, is large enough so that a direct ultrasound signal from the first ultrasonic transducer to the second ultrasonic transducer is separated in time from later echoes, such that $$L \geq s * \tau * n_\tau * \frac{c_0}{2}$$

where $c_0$, is a speed of sound, s is a selectable safety factor greater than zero, $n_\tau$ is a number of periods of the direct ultrasound signal, and $\tau$ is a period length of the direct ultrasound signal, and/or
   wherein a distance of the first and second installation stations from respective adjacent side walls of the inspection chamber, and consequently a distance, a, of the ultrasound measurement path from the side walls, is large enough so that the direct ultrasound signal on the ultrasound measurement path is separated in time from secondary ultrasound signals that do not propagate on the ultrasound measurement path, such that $$a \geq \sqrt{\frac{(C_0 * \tau * n_\tau * s + L)^2}{4}}.$$

2. The portable inspection device in accordance with claim 1,
wherein the inspection chamber has a minimal volume, such that dimensions thereof are only just so large that the conditions on the length of the ultrasound measurement path and on the distance of the ultrasound measurement path from the side walls are satisfied.

3. The portable inspection device in accordance with claim 1,
wherein the installation stations and consequently the ultrasound measurement path are arranged centrally in the inspection chamber.

4. The portable inspection device in accordance with claim 1,
wherein the inspection chamber has a sound-absorbing material at its walls.

5. The portable inspection device in accordance with claim 1,
wherein the inspection chamber has non-planar side surfaces.

6. The portable inspection device in accordance with claim 5,
wherein the inspection chamber is cylindrical.

7. The portable inspection device in accordance with claim 1,
wherein the inspection chamber is produced from a non-metallic material.

8. The portable inspection device in accordance with claim 7,
wherein the inspection chamber is produced from plastic.

9. The portable inspection device in accordance with claim 1,
wherein at least one dividing element is arranged in the inspection chamber.

10. The portable inspection device in accordance with claim 9,
wherein the dividing element is permeable to sound.

11. The portable inspection device in accordance with claim 1,
further comprising a pressure sensor, a temperature sensor, and/or a humidity sensor.

12. The portable inspection device in accordance with claim 1,
wherein the inspection device has a control and evaluation unit that is configured to calculate a speed of sound for the fluid in the inspection chamber.

13. The portable inspection device in accordance with claim 1,
further comprising an interface to receive measurement values of the ultrasound flow meter and/or to transfer parameters to the ultrasound flow meter.

14. The portable inspection device in accordance with claim 13,
wherein the measurement values comprises one of a measured flow velocity and speed of sound.

15. The portable inspection device in accordance with claim 13,
wherein the transfer parameters comprise the length L of the ultrasound measurement path.

16. The portable inspection device in accordance with claim 1,
further comprising a control and evaluation unit that is configured to compare at least one of a flow velocity measured in the inspection chamber with zero and a speed of sound measured in the inspection chamber with an expected speed of sound.

17. The portable inspection device in accordance with claim 1,
wherein the installation stations are arranged at oppositely disposed walls of the inspection chamber; or wherein the installation stations are arranged at the same wall of the inspection chamber and an ultrasound reflector is arranged at the oppositely disposed wall of the inspection chamber.

18. The portable inspection device in accordance with claim 1, wherein the inspection device is configured in two parts with a first part and a second part of the inspection chamber so that the inspection chamber can be opened and closed and/or wherein the inspection device has dimensions and a weight by which the inspection device can be transported by one person under his own power.

19. A method of inspecting and/or calibrating an ultrasound flow meter, comprising:
installing a first ultrasonic transducer of the ultrasound flow meter on a first installation station in an inspection chamber;
installing a second ultrasonic transducer of the ultrasound flow meter on a second installation station in the inspection chamber, the inspection chamber having a fluid at a flow velocity of zero such that the first and second ultrasonic transducers are directed toward one another on a connection line and span an ultrasound measurement path through the inspection chamber on the connection line; and
measuring at least one of the flow velocity and the speed of sound in the inspection chamber with the ultrasound flow meter,
wherein due to the geometry of the inspection chamber and the arrangement of the first and second installation stations, a length, L of the ultrasound measurement path is large enough so that a direct ultrasound signal from the first ultrasonic transducer to the second ultrasonic transducer is separated in time from later echoes, such that, $$L \geq s * \tau * n_{\tau *} \frac{c_0}{2},$$

where $c_0$, is a speed of sound, s is a selectable safety factor greater than zero, $n_\tau$ is a number of periods of the direct ultrasound signal, and $\tau$ is a period length of the direct ultrasound signal, and/or
wherein a distance, a, of the ultrasound measurement path from side walls is large enough so that the direct ultrasound signal on the ultrasound measurement path is separated in time from secondary ultrasound signals that do not propagate on the ultrasound measurement path, such that $$a \geq \sqrt{\frac{(C_0 * \tau * n_\tau * s + L)^2}{4}}.$$

20. The method in accordance with claim 19, further comprising providing a portable inspection device, wherein the inspection device comprises the inspection chamber, the first installation station, the first ultrasonic transducer, the second installation station, and the second ultrasonic transducer.

\* \* \* \* \*